(12) United States Patent
Newville

(10) Patent No.: US 12,215,469 B1
(45) Date of Patent: Feb. 4, 2025

(54) DEPLOYABLE TRAFFIC MITIGATORS WITH A NETWORK ARRAY

(71) Applicant: Taylor Rae Newville, San Diego, CA (US)

(72) Inventor: Taylor Rae Newville, San Diego, CA (US)

( * ) Notice: Subject to any disclaimer, the term of this patent is extended or adjusted under 35 U.S.C. 154(b) by 0 days.

(21) Appl. No.: 18/387,429

(22) Filed: Nov. 6, 2023

(51) Int. Cl.
  *E01F 9/529* (2016.01)
  *E01F 9/30* (2016.01)
  *H04W 84/18* (2009.01)

(52) U.S. Cl.
  CPC ............ *E01F 9/529* (2016.02); *E01F 9/30* (2016.02); *H04W 84/18* (2013.01)

(58) Field of Classification Search
  None
  See application file for complete search history.

(56) References Cited

U.S. PATENT DOCUMENTS

| | | | | | |
|---|---|---|---|---|---|
| 3,399,607 | A * | 9/1968 | Eigenmann | ............ | E01F 9/578 404/19 |
| 3,963,363 | A * | 6/1976 | Roper | ............ | E01F 9/594 404/9 |
| 6,010,277 | A * | 1/2000 | Follman | ............ | E01F 9/529 404/11 |
| 7,011,470 | B1 * | 3/2006 | Breazeale | ............ | E01F 9/529 404/11 |
| 7,859,431 | B2 * | 12/2010 | Peddie | ............ | E01F 9/559 340/907 |
| 9,951,487 | B1 * | 4/2018 | Gonzalez De Cosio Leal | ............ | E01F 9/529 |
| 10,577,762 | B2 * | 3/2020 | Abu Al-Rubb | ............ | E01F 13/126 |
| 10,648,141 | B2 * | 5/2020 | Merrill | ............ | E01F 9/529 |
| 10,745,870 | B2 * | 8/2020 | Xiang | ............ | F16H 31/001 |
| 11,417,191 | B2 * | 8/2022 | Maus | ............ | G08G 1/205 |
| 11,453,986 | B2 * | 9/2022 | Janniello | ............ | G08G 1/02 |
| 2006/0227009 | A1 * | 10/2006 | Koehn | ............ | E01F 9/529 340/925 |

(Continued)

FOREIGN PATENT DOCUMENTS

| | | | | | |
|---|---|---|---|---|---|
| CN | 108660968 | B | * | 4/2020 | ............ E01F 13/048 |
| CN | 114592451 | A | * | 6/2022 | |

(Continued)

*Primary Examiner* — Thomas B Will
*Assistant Examiner* — Katherine J Chu
(74) *Attorney, Agent, or Firm* — Perkins Coie LLP

(57) ABSTRACT

Systems and methods for mitigating traffic are disclosed herein. In some embodiments, a traffic mitigation system includes a plurality of traffic mitigation devices. Each traffic mitigation device can include a base, a cap movably coupled to the base, a motor coupled to move the cap between a flush position and a raised position, a battery coupled to the motor, a power generator coupled to the battery, and an electronics unit housed in the base. The electronics unit comprises a control circuit coupled to control operation of the motor and a communication module operably coupled to the control circuit. The communication modules can receive signals indicating desired operating times from an operator device. The control circuits can then synchronously switch the traffic mitigation devices between the flush and raised positions. The communication modules can also communicate with each other to further synchronize movement of the caps.

7 Claims, 12 Drawing Sheets

(56) References Cited

U.S. PATENT DOCUMENTS

| | | | | |
|---|---|---|---|---|
| 2011/0035140 A1* | 2/2011 | Candy | ..................... | E01F 9/578 |
| | | | | 701/119 |
| 2015/0216021 A1* | 7/2015 | Bennett | ................. | H05B 47/19 |
| | | | | 362/555 |
| 2015/0252540 A1* | 9/2015 | Lee | ........................ | E01F 9/529 |
| | | | | 404/6 |
| 2016/0275791 A1* | 9/2016 | Fleming | ................. | E01F 9/529 |
| 2018/0061238 A1* | 3/2018 | Lei | ........................ | G08G 1/167 |
| 2020/0321829 A1* | 10/2020 | Dmitriev | ................. | F03G 7/08 |
| 2021/0372062 A1* | 12/2021 | Kunde | .................... | E01F 9/529 |
| 2022/0195679 A1* | 6/2022 | Kannan | .................. | E01F 9/582 |
| 2023/0274639 A1* | 8/2023 | Gur Arie | ............... | G08G 1/056 |
| | | | | 340/907 |

FOREIGN PATENT DOCUMENTS

| | | | | | |
|---|---|---|---|---|---|
| CN | 114934719 | A | * | 8/2022 | |
| EP | 1074662 | A2 | * | 2/2001 | ............. E01F 9/594 |
| EP | 3460777 | A1 | * | 3/2019 | ............. E01F 9/529 |
| GB | 2079356 | A | * | 1/1982 | ............. E01F 13/08 |
| WO | WO-2008109947 | A1 | * | 9/2008 | ................ E01F 9/30 |
| WO | WO-2018050945 | A1 | * | 3/2018 | ................ E01F 9/50 |

\* cited by examiner

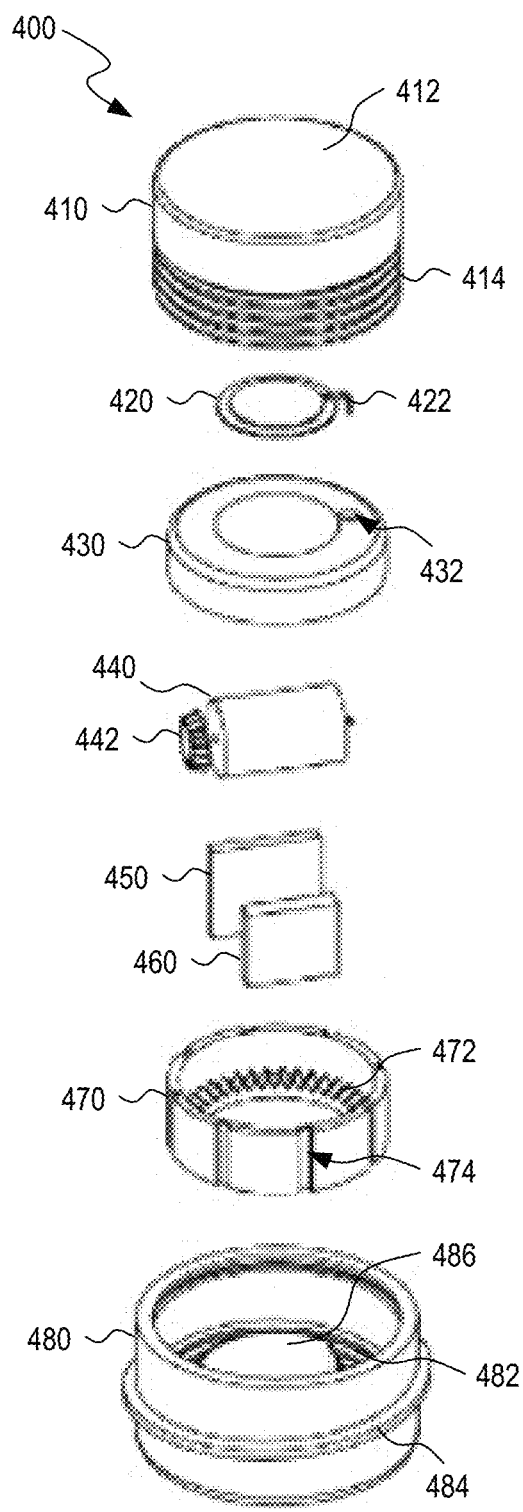
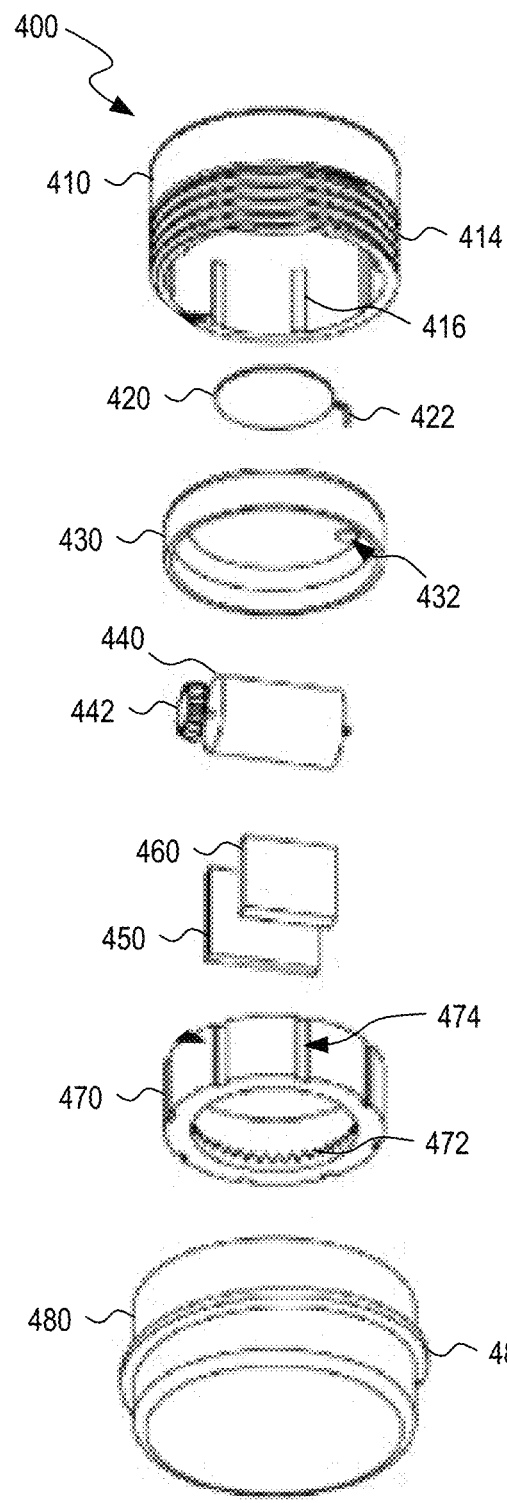
*FIG. 4A*     *FIG. 4B*

DEPLOYABLE TRAFFIC MITIGATORS WITH A NETWORK ARRAY

TECHNICAL FIELD

This disclosure is generally directed to deployable networked traffic mitigators and associated systems and methods.

BACKGROUND

Certain roads require periodic traffic control but employing such control at all times throughout the day may be undesirable. For example, school zones need systems to slow down vehicles when students are present (e.g., in the morning, after classes or activities end), but such systems can needlessly interfere with traffic at other times. Conventional systems for traffic control, such as traffic signs (e.g., speed limit signs) and speed bumps, are either not followed or unable to selectively control traffic. Thus, there is a need for traffic mitigators that can control traffic at desired times and are convenient to install and operate.

BRIEF DESCRIPTION OF THE DRAWINGS

FIGS. 4A and 4B are top and bottom perspective exploded views, respectively, of an example traffic mitigation device.

The techniques introduced here may be better understood by referring to the following Detailed Description in conjunction with the accompanying drawings, in which like reference numerals indicate identical or functionally similar elements.

DETAILED DESCRIPTION

I. Overview

Figure 1A:
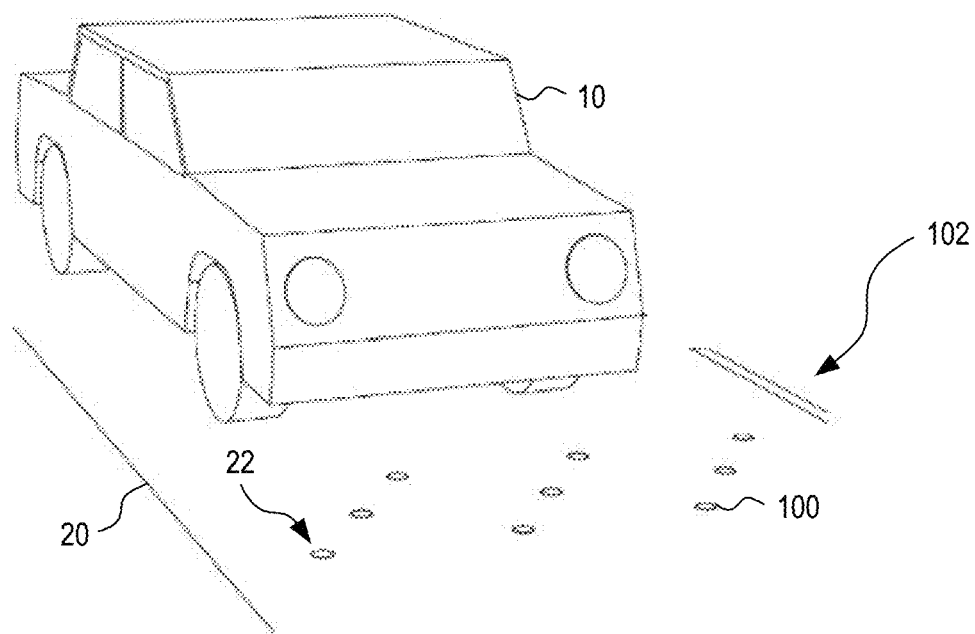
FIGS. 1A and 1B are perspective views of a traffic mitigation system in a lowered position and a raised position, respectively.

At least some aspects of the present disclosure are directed to individual traffic mitigators with a network array. Some roads, such as those near schools and event stadiums, require traffic control during busy periods to increase safety, but having such traffic control 24/7 can needlessly interfere with traffic during non-busy periods, causing unnecessary traffic congestion and driver frustration. Conventional speed bumps in the form of raised, rounded humps, which are made from asphalt, concrete, or rubber, are static and cannot easily be removed during non-busy periods. Conventional systems for slowing traffic also include speed limits (including radar speed signs), but such speed limits can be costly to enforce on every road and are often ignored. Conventional systems for traffic management further include roundabouts or road narrowing, but these solutions require road reconstruction and also remain static like conventional speed bumps. Thus, traffic mitigators that can be controlled to mitigate traffic only during desired time periods (e.g., busy periods, school zone hours, etc.) and are convenient to install and operate are needed.

In some embodiments, a traffic mitigation system can include at least one controller and a plurality of individually deployable speed bumps. The speed bumps can be configured to actuate between different configurations. The configurations can include, for example, a lowered configuration for being positioned within a roadway, a raised configuration for protruding upwardly from the roadway, and/or other configurations for affecting traffic. The speed bumps can be flush or below the roadway surface when in the lowered position. For example, the speed bumps can remain in the raised configuration while vehicles drive across them without damages the vehicles (e.g., without damaging, suspension, tires, etc.).

The deployable speed bumps can be programmed to communicate (e.g., via a network) to coordinate operation (e.g., actuation, deployment, etc.) of all or some of the speed bumps. The speed bumps can be spaced apart (e.g., horizontally spaced apart, laterally spaced apart, etc.) across one or more lanes of a roadway. The speed bumps can collectively define a speed bump zone having a generally polygonal shape (e.g., rectangular shape), strip, cross walk shape, or other configuration or other shape selected by the installer. The speed bumps can be, for example, actuated electronically, pneumatically, hydraulically, and/or using any other suitable actuation means.

In some embodiments, a traffic mitigation system includes a plurality of traffic mitigation devices in the form of electronic speed bumps. When the speed bumps are in a raised or deployed state, they can extend upwardly from the roadway surface to encourage drivers to slow down. Each traffic mitigation device can include a base, a cap movably coupled to the base, and a motor coupled to move the cap between a lowered or flush position and a raised position. When the traffic mitigation device is in the flush position, the cap is generally flush with a road surface such that drivers can drive vehicles over the traffic mitigation device without slowing down. When the traffic mitigation device is in the raised position, the cap is at an elevated position relative to the road surface and protrudes out such that drivers are induced to slow down or stop. Each traffic mitigation device can further include a battery coupled to the motor, a power generator coupled to the battery, and an electronics unit housed in the base. The power generator is configured to generate electricity and charge the battery with the generated electricity. The power generator can comprise a piezoelectric element, a solar array, or other power generating mechanism. The electronics unit comprises a control circuit coupled to control operation of the motor and a communication module operably coupled to the control circuit.

The communication modules can be configured to receive signals from a nearby or remote operator device. The signals can include authentication information, desired operating times such as when to switch between the flush position and the raised position, the current date and time, etc. In some embodiments, a portion of the traffic mitigation devices (e.g., fewer than all of the devices included in the system) receive the signals and then transmit the signals to the remaining ones of the traffic mitigation devices such that the operator device need not upload data to each and every device included in the system. In some embodiments, the communication modules include one or more transmitters and receivers. The transmitters can transmit, for example, signals, instructions, data, or information. The receivers can receive signals, instructions, data, or information from other communication modules of other mitigation devices.

During operation, the control circuits can synchronously switch the traffic mitigation devices between the flush position and the raised position based on the received desired operating times. In some embodiments, the traffic mitigation devices can further synchronize their movements by communicating with one another at or around the desired operating times. Synchronizing movement can include switching between the flush position and the raised position simultaneously, in a pattern, etc. The traffic mitigation devices can be programmed to autonomously operate based on, for example, one or more user settings, schedules, or the like. For example, the traffic mitigation devices can automatically move between a selected number of positions, including a lowered position, an intermediate position, a partially raised position, and a fully raised position. The height of the traffic mitigation device extending above the roadway can be selected based on the desired reduction in speed of vehicles.

In some embodiments, the traffic mitigation device includes a locking feature coupled to the base and configured to secure the traffic mitigation device in the road (e.g., in a socket in the road). In some embodiments, the traffic mitigation device includes a magnet switch that can be toggled when an operator magnet is in close proximity in order to switch the traffic mitigation device between a listening mode and a reduced power mode.

In some embodiments, in each traffic mitigation device, the base has a base sidewall including first threads and the cap has a cap sidewall including second threads and at least one rib. Each device further includes a pinion coupled to the motor and a rotator rotatably positioned in the base. The rotator includes a ring gear positioned to engage the pinion and at least one slot positioned to engage the at least one rib. Operation of the motor rotates the pinion along a motor axis, which then rotates the ring gear, and thereby the rotator and the at least one slot, about a vertical axis. Rotating the at least one slot rotates the at least one rib, and thereby the cap, about the vertical axis. Rotating the cap causes the second threads to engage the first threads and thereby move the cap between the flush position and the raised position.

II. Traffic Mitigation System

Figure 1B:
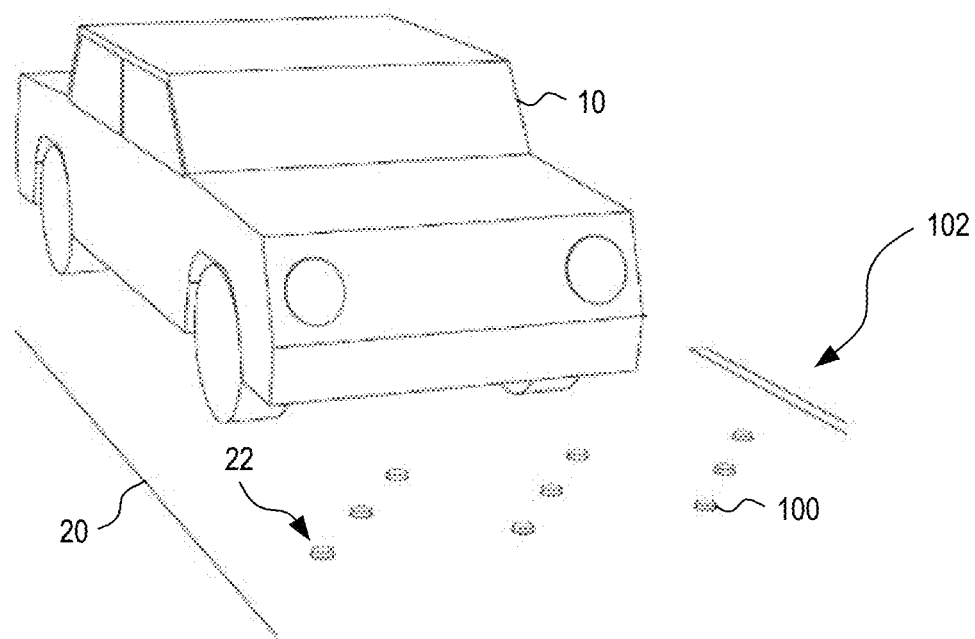

FIGS. 1A and 1B are perspective views of a traffic mitigation system 102 in a flush position (also referred to as "the lowered configuration") and a raised position (also referred to as "the raised configuration"), respectively. The traffic mitigation system 102 includes a plurality of traffic mitigation devices 100 (also referred to as "the plurality of individually deployable speed bumps 100") embedded on or positioned within a roadway or road 20. The number of traffic mitigation devices 100 included in the traffic mitigation system 102 can be any number between 1 and 100, or more. In the illustrated embodiment, the traffic mitigation system 102 includes traffic mitigation devices 100 that are adjacent to one another on the road 20. In other embodiments, the traffic mitigation system 102 includes traffic mitigation devices 100 that are not adjacent to one another on the road 20 and/or positioned on different roads. For example, the traffic mitigation system 102 for a school can include multiple groups of traffic mitigation devices 100 with each group located on a different road around the school such that the entire school area can be managed via a single traffic mitigation system controller.

Each traffic mitigation device 100 can be installed in a corresponding socket 22 that is cut, stamped, or otherwise formed into the road 20. Each traffic mitigation device 100 can be secured in the corresponding socket 22 using adhesives, press-fit, fasteners, locking features included in the traffic mitigation device 100, and/or other mechanisms. This allows installation of the traffic mitigation devices 100 along existing roadways without, for example, resurfacing the entire roadway, damaging the surrounding material of the roadway, or the like. Additionally, the traffic mitigation devices (or portions or parts of the traffic mitigation devices) can be removed from the roadway. For example, the traffic mitigation devices 100 can be removed from the roadway without damaging the surrounding material of the roadway in order to perform maintenance, replace the mitigation device 100 (or replace components of the mitigation devices), or perform other operations. In some embodiments, each traffic mitigation device 100 is removably secured in the corresponding socket 22 such that the traffic mitigation device 100 can be removed for maintenance or replacement with ease. The traffic mitigation devices 100 can be spaced apart (e.g., laterally) across at least one lane of the road 20, as shown. In some embodiments, the traffic mitigation devices 100 are spaced apart (e.g., evenly spaced apart, unevenly spaced apart, etc.) to collectively define a speed bump zone extending partially or completely across the road 20. In some embodiments, the speed bump zone has a generally rectangular shape and extends generally perpendicular to, for example, a lengthwise direction of the lane on the roadway, direction of traffic travel, etc. The number of traffic mitigation devices 100 per area can be selected based on a targeted reduction of speed, configuration of the mitigation devices, or the like. For example, a roadway can have a speed bump zone with at least 1, 2, 3, 4, 5, 6, 7, 8, 9, 10, or 15 mitigation devices per area, such as 1 ft$^2$, 1 m$^2$, etc. The pattern, spacing, and number of traffic mitigation devices 100 can be selected based on the size and/or shape of the speed bump zone.

As shown in FIG. 1A, the traffic mitigation devices 100 are flush with the upper surface of the road 20 when in the flush position. The traffic mitigation devices 100 can therefore cooperate with the surrounding upper surface of the roadway to define a generally smooth, continuous driving surface for allowing vehicle 10 (e.g., car, motorcycle, truck, semi-truck) to drive over without slowing down. As shown in FIG. 1B, the traffic mitigation devices 100 protrude upwardly from the road 20 when in the raised position. In the raised position, the traffic mitigation devices 100 effectively mitigate traffic by visually indicating to a driver that the vehicle 10 should slow down before being driven over. As will be described further herein, the traffic mitigation devices 100 can be controlled and/or programmed to move between the flush position (FIG. 1A) and the raised position (FIG. 1B) on command, at predetermined times, and/or autonomously.

Figure 2A:
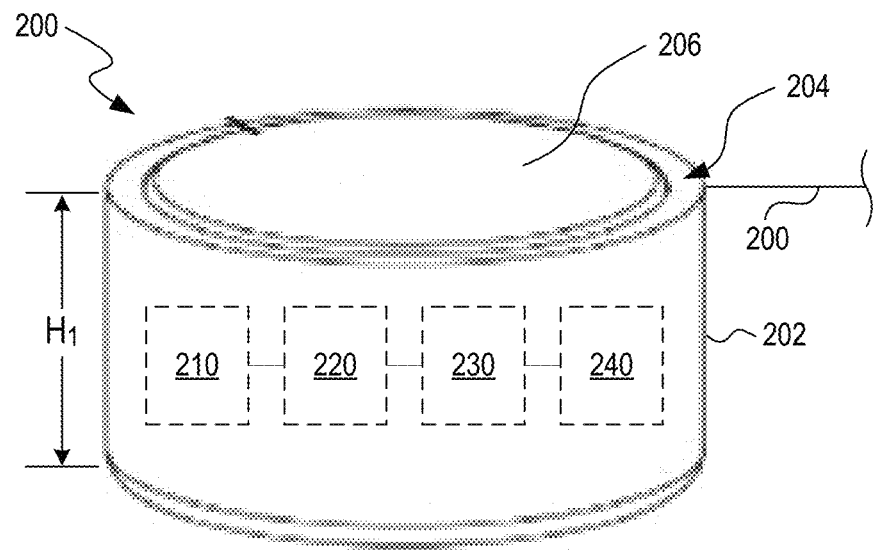
FIGS. 2A and 2B are perspective views of a traffic mitigation device in a lowered position and a raised position, respectively.
Figure 2B:
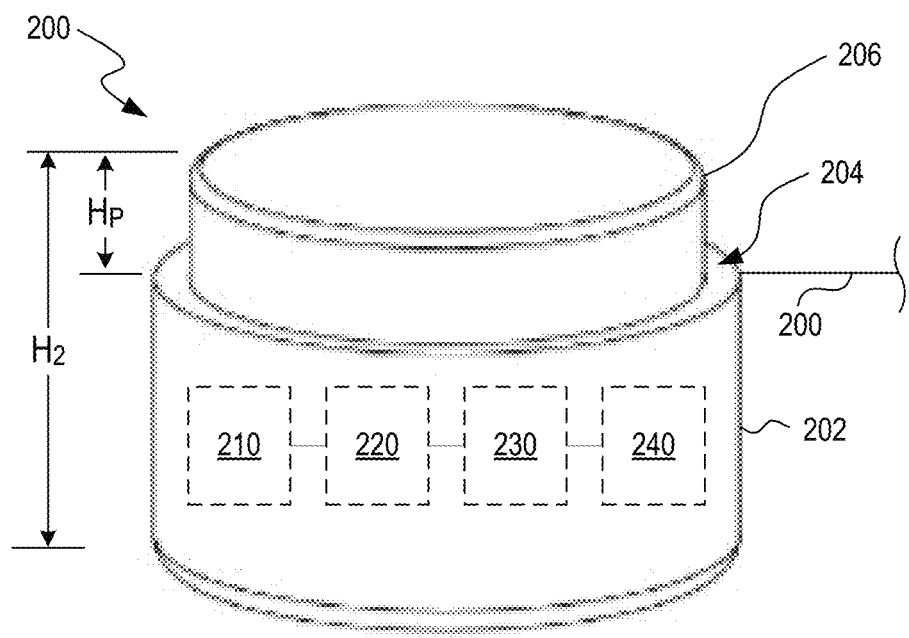

FIGS. 2A and 2B are perspective views of a traffic mitigation device 200 in a flush position and a raised position, respectively. The traffic mitigation device 200 can be an example of the traffic mitigation device 100 illustrated in FIGS. 1A and 1B, and can be included in a traffic mitigation system comprising multiple traffic mitigation devices 200. The traffic mitigation device 200 includes a base 202 having a cavity 204, a cap 206 positioned at least partially in the cavity 204, a power generator 210, a battery 220, a motor 230 (or other height adjustment feature), and an electronics unit 240. The power generator 210, the battery 220, the motor 230, and the electronics unit 240 can be housed between the base 202 and the cap 206 (e.g., within the cavity 204) for protection. In some embodiments, the base 202 and the cap 206 form a weatherproof, heatproof, and/or waterproof housing.

The base 202 and the cap 206 can be made from plastic, metal (e.g., steel, aluminum), or other material that is able to both withstand the expected forces during operation (e.g., a portion of a vehicle's weight) and allow wireless transmission of signals through. In the illustrated embodiment, the base 202 and the cap 206 each has a cylindrical form factor and a circular cross-section. In other embodiments, the base 202 and the cap 206 have other cross-sections such as elliptical, triangular, rectangular, hexagonal, etc. Moreover, while the cap 206 is nested inside the base 202 in the illustrated embodiment, in other embodiments, the base 202 can be nested inside the cap 206, the base 202 and the cap 206 may not be nested, etc. A cross-sectional dimension of the traffic mitigation device 200 (e.g., diameter) can be about 1 inch, 2 inches, 3 inches, 4 inches, 5 inches, 6 inches, 7 inches, 8 inches, 9 inches, 10 inches, 11 inches, 12 inches, or greater. A vertical dimension or height $H_1$ (FIG. 2A) of the traffic mitigation device 200 when in the flush position can be about 1 inch, 2 inches, 3 inches, 4 inches, 5 inches, 6 inches, 7 inches, 8 inches, 9 inches, 10 inches, 11 inches, 12 inches, or greater. A vertical dimension or height H2 (FIG. 2B) of the traffic mitigation device 200 when in the raised position can be about 3 inches, 4 inches, 5 inches, 6 inches, 7 inches, 8 inches, 9 inches, 10 inches, 11 inches, 12 inches, 13 inches, 14 inches, or greater. The height Hp (FIG. 2B) of the protruding portion can be 1 inch, 2 inches, 3 inches, 4 inches, 5 inches, or other desired heights.

In some embodiments, the motor 230 (or other height adjustment feature) can be operated such that a vertical dimension of the cap 206 relative to the top of the base 202 or the surface of the road when the traffic mitigation device 200 is in the raised position (FIG. 2B) can be adjusted to correlate with a speed limit. For example, the cap 206 can be at a first distance from the surface of the road to provide a first effective speed limit (e.g., 35 miles per hour), then the motor 230 can be operated such that the cap 206 is at a second distance from the surface of the road that is greater than the first distance to provide a second effective speed limit that is lower than the first effective speed limit (e.g., 20 miles per hour). The vertical dimension of the cap 206 relative to the top of the base 202 or the surface of the road when the traffic mitigation device 200 is in the raised position can be about 1 inch, 2 inches, 3 inches, 4 inches, 5 inches, 6 inches, 7 inches, 8 inches, 9 inches, 10 inches, 11 inches, 12 inches, or greater.

The power generator 210 can generate electricity to power the motor 230 and the electronics unit 240. The power generator 210 can comprise a piezoelectric element (as described in further detail below with respect to FIGS. 4A-6B), a solar array, or other power generating mechanism. The battery 220 can be coupled to receive and store the energy generated by the power generator 210, and deliver the energy to the motor 230 and/or the electronics unit 240 as needed. The motor 230 can be coupled to move the cap 206 between the flush position and the raised position. In some embodiments, the motor 230 comprises a self-centering motor biased to keep the cap 206 in the flush position or the raised position when not actively powered. This can be advantageous when the traffic mitigation device 200 runs out of power and it is desirable to keep the traffic mitigation device 200 in either the flush position or the raised position by default.

The electronics unit 240 can include various components for managing operation of the motor 230. For example, the electronics unit 240 can include at least one controller or control circuit operably coupled to control operation of the motor 230 and a communication module operably coupled to the control circuit. The control circuit can be programmed to store a schedule (e.g., a deployment and retraction schedule). In some embodiments, the control circuit is programmed to store height settings in the raised position, where the height settings are adjustable to increase or decrease height of the traffic mitigation device 200 in the raised position to correspondingly decrease or increase speeds of the vehicles traveling across. The communication module can be configured to communicate with other devices, such as an operator device external to the traffic mitigation system or communication modules of adjacent traffic mitigation devices. The control circuit and/or communication module can be programmed to send an alert (e.g., to a user device or an operator device) in response to malfunctioning of one or more of the traffic mitigation devices 200. In some embodiments, the electronics unit 240 includes an electronic storage medium comprising computer-executable instructions and one or more processors in electronic communication with the electronic storage medium and configured to execute the computer-executable instructions in order to operate the traffic mitigation device 200. In some embodiments, the electronics unit 240 can store information in memory, and the stored information can include, but is not limited to, schedules, grouping of traffic mitigation devices 200, configurations of traffic mitigation devices 200 (e.g., height of raised position, height of partially raised position, etc.), data collected by the traffic mitigation devices 200 (e.g., weight of vehicles, traffic data, speed of vehicles, images of vehicles, traffic times, images of the roadway, etc.), communication data (e.g., protocols, authentication information, tokens, and/or settings. In some embodiments, the collected data can include, for example, weight of vehicle data, speed of vehicles data, component operation data, or the like.

In some embodiments, the traffic mitigation device 200 includes additional or alternative components. For example, the traffic mitigation device 200 can include a lighting component (e.g., an LED) positioned proximate to the cap 206 and operably coupled to the electronics unit 240. The control circuit can be used to control the lighting component (e.g., turning it on and off, changing brightness or color) such that the traffic mitigation device 200 can emit light and thereby warn drivers that the traffic mitigation devices 200 are in the raised position (e.g., by emitting a bright light), are switching between the flush position and the raised position (e.g., by flashing light), etc. In some embodiments, the communication modules can communicate with existing infrastructure, such as pedestrian crossing buttons, such that the cap 206 can be moved to the raised position and/or the lighting component can be turned on as a way to signal to drivers that, for example, people are crossing the street (e.g., by configuring the lighting component to flash red). In some embodiments, the traffic mitigation device 200 automatically locks in the raised position to prevent collapse of the traffic mitigation device 200 when driven upon by vehicles.

Figure 3:
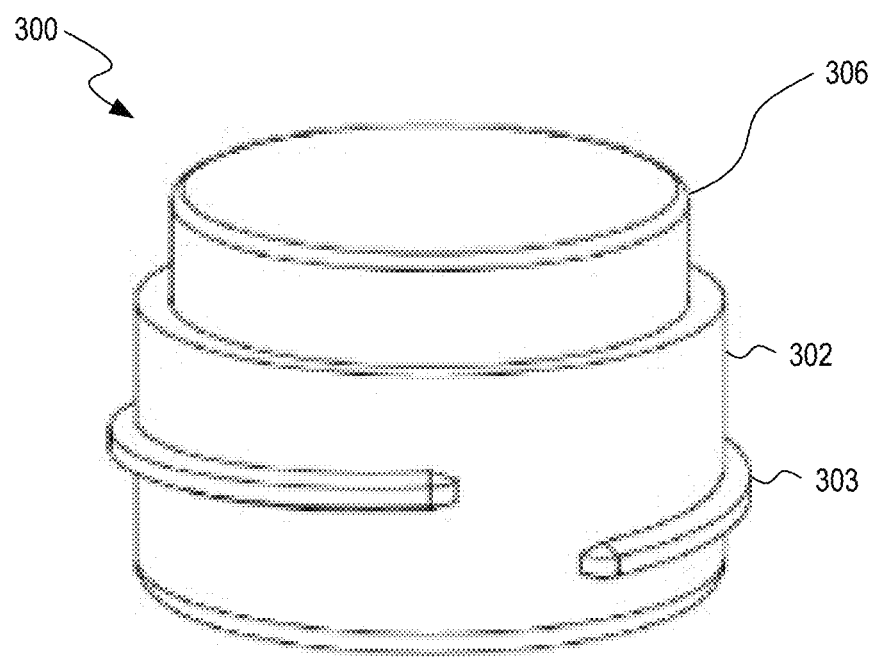
FIG. 3 is a perspective view of a traffic mitigation device with one or more locking features.

FIG. 3 is a perspective view of a traffic mitigation device 300 with one or more locking features 303 coupled to an exterior surface of a base 302. The one or more locking features 303 can comprise protrusion, threads, detentes, cutouts, fasteners, or other mechanisms to permanently or releasably secure the base 302 in a road socket (e.g., the socket 22 illustrated in FIGS. 1A and 1). During operation of the traffic mitigation device 300, the one or more locking features 303 can keep the base 302 fixed in position relative to the road while a cap 306 moves relative to the base 302 in order to selectively mitigate traffic as desired.

III. Traffic Mitigation Device

FIGS. 4A and 4B are top and bottom perspective exploded views, respectively, of a traffic mitigation device 400. The traffic mitigation device 400 can be an example of the traffic mitigation device 100 illustrated in FIGS. 1A and 1, and can be included in a traffic mitigation system comprising multiple traffic mitigation devices 400. The traffic mitigation device 400 includes a cap 410, a piezoelectric element 420, a support 430, a motor 440, an electronics unit 450, a power source or battery 460 (e.g., one or more recharge batteries), a rotator 470, and a base 480. One skilled in the art will appreciate that the traffic mitigation device 400 can include additional, fewer, and/or alternative components.

The cap 410 can include a flexible top 412 (FIG. 4A) and a sidewall with threads 414 on the outside and at least one rib 416 on the inside. The piezoelectric element 420 can be coupled to a wire 422 that extends to the motor 440 and/or the battery 460. The support 430 can include an aperture 432 through which the wire 422 extends. The support 430 can be coupled to the cap 410 such that the support 430 moves with the cap 410 when the traffic mitigation device 400 moves between the flush position and the raised position. The piezoelectric element 420 can be positioned between the flexible top 412 of the cap 410 and the support 430.

The motor 440 can be mechanically coupled to the base 480 and electrically coupled to the piezoelectric element 420 (e.g., via the wire 422) and/or the battery 460. A pinion 442 can be coupled to the motor 440. In some embodiments, the electronics unit 450 includes a control circuit coupled to control operation of the motor 440 and a communication module operably coupled to the control circuit. The communication module can be configured to communicate with other devices, such as an operator device external to a traffic mitigation system or communication modules of adjacent traffic mitigation devices. In some embodiments, the electronics unit 450 includes an electronic storage medium comprising computer-executable instructions and one or more processors in electronic communication with the electronic storage medium and configured to execute the computer-executable instructions in order to operate the traffic mitigation device 400. The battery 460 can be coupled to the piezoelectric element 420 (e.g., via the wire 422) and/or the motor 440. Each of the electronics unit 450 (and its components) and the battery 460 can be mechanically coupled to the motor 440 and/or the base 480.

The rotator 470 has a cylindrical or annular shape, and can be positioned in the base 480. The rotator 470 can include a ring gear 472 and at least one slot 474 on the outer surface and positioned to engage the corresponding at least one rib 416. The base 480 can include a sidewall with threads 482 on the inner surface, a locking feature 484 (e.g., an elongate protrusion, threads) on the outer surface configured to secure the base 480 in a road socket, and a cylindrical protrusion or wall 486 extending upward from the bottom surface of the base 480. The cylindrical wall 486 can have a diameter such that the rotator 470 can be positioned and can rotate around the cylindrical wall 486.

Figure 5:
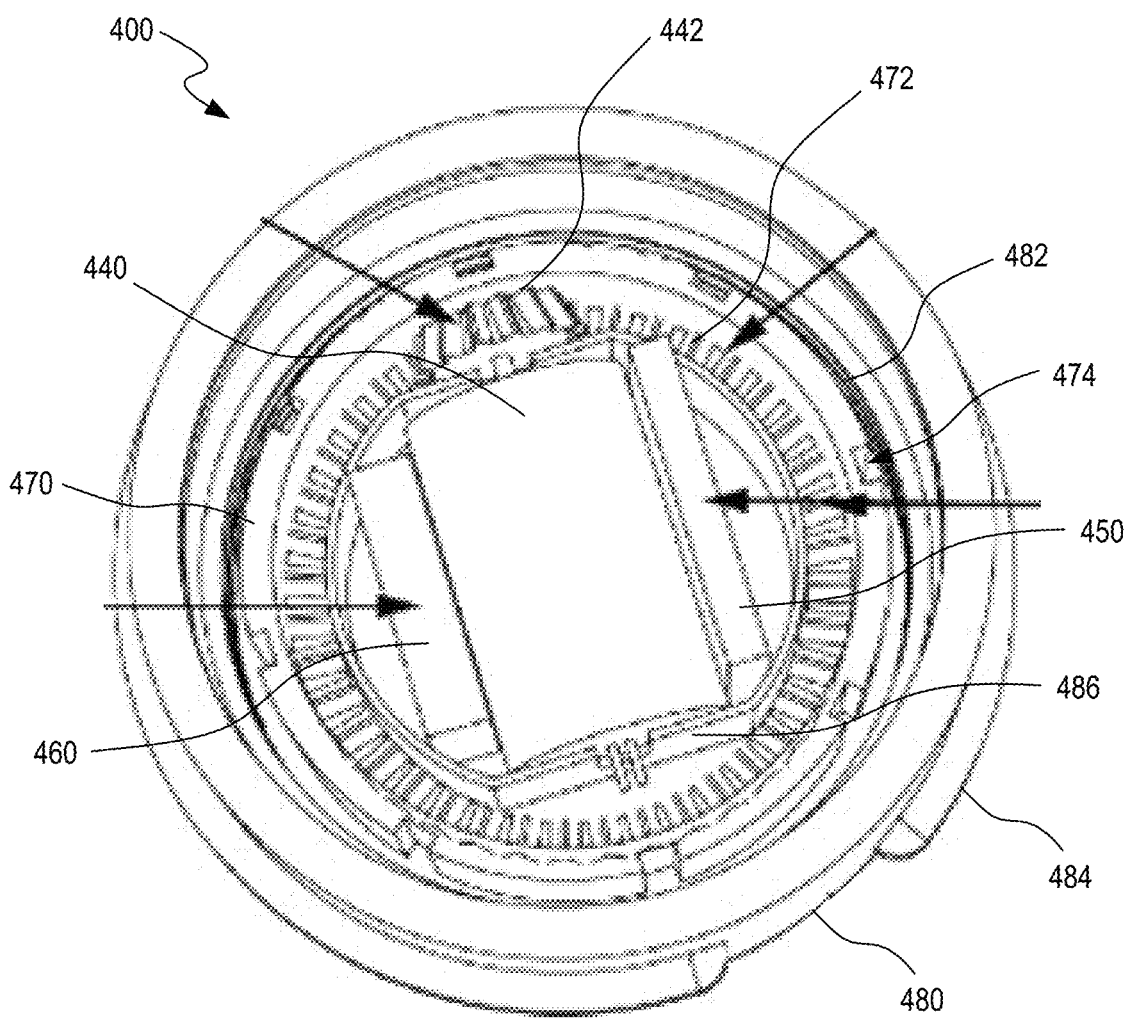
FIG. 5 is a top view of the partially assembled traffic mitigation device of FIG. 4A.

FIG. 5 is a top view of the traffic mitigation device 400 partially assembled, with the cap 410, the piezoelectric element 420, and the support 430 removed so as not to obscure certain features. As shown, the motor 440, the electronics unit 450, and the battery 460 are coupled to the base 480, such as within the cylindrical wall 486. Because the base 480 remains stationary relative to the road during operation, the motor 440, the electronics unit 450, and the battery 460 also remain stationary during operation of the traffic mitigation device 400. The rotator 470 is positioned around the cylindrical wall 486 and the ring gear 472 is engaged with the pinion 442. As shown, the cylindrical wall 486 can include a flat edge on either end of the motor 440 to allow space for the pinion 442 and wires (partially shown) extending from the motor 440. In some embodiments, the rotator 470 is not directly coupled to the base 480 such that the rotator 470 is free to rotate around the cylindrical wall 486, but remains on the bottom surface of the base 480 due to its weight.

Referring to FIGS. 4A, 4B, and 5 together, to fully assemble the traffic mitigation device 400, the support 430 can be coupled to the cap 410, the piezoelectric element 420 can be positioned between the flexible top 412 of the cap 410 and the support 430, and the wire 422 can be extended through the aperture 432 and connected to the motor 440, the electronics unit 450, and/or the battery 460. The sidewalls of the cap 410 can then be inserted in the gap between the rotator 470 and the base 480 such that the at least one rib 416 of the cap 410 is slid into the corresponding at least one slot 474. The cap 410 is then rotated such that the threads 414 engage the threads 482 until the cap 410 is securely coupled to the base 480. When rotating the cap 410 into the base 480, the rotator 470 also rotates by virtue of the at least one rib 416 interlocked with the at least one slot 474.

Figure 6A:
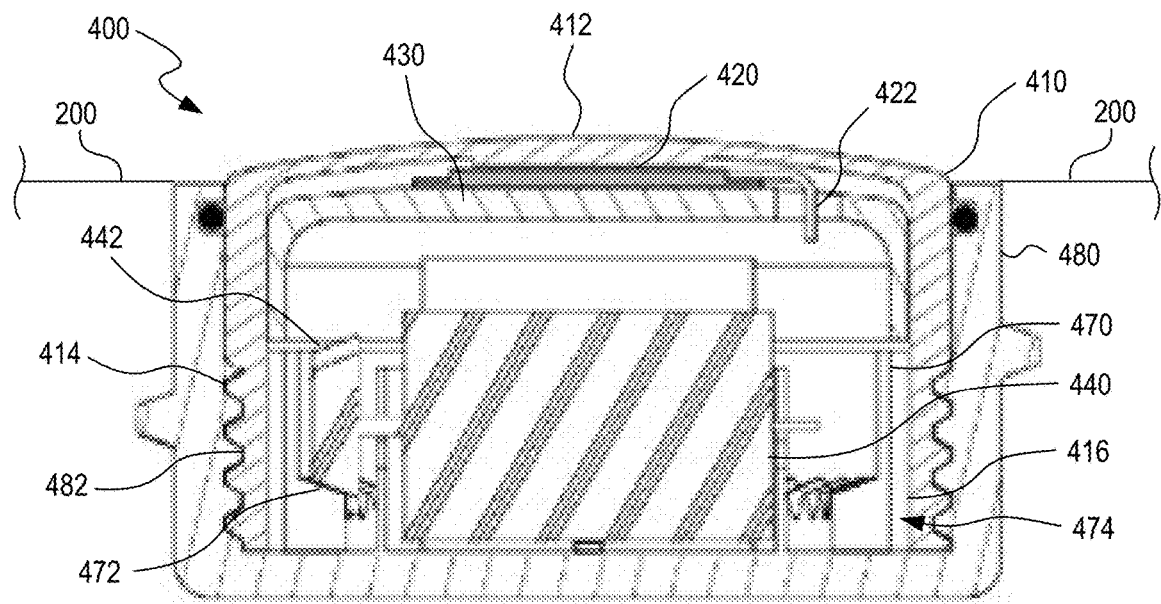
FIGS. 6A and 6B are side cross-sectional views of the traffic mitigation device of FIG. 4A in a lowered position and in a raised position, respectively.
Figure 6B:
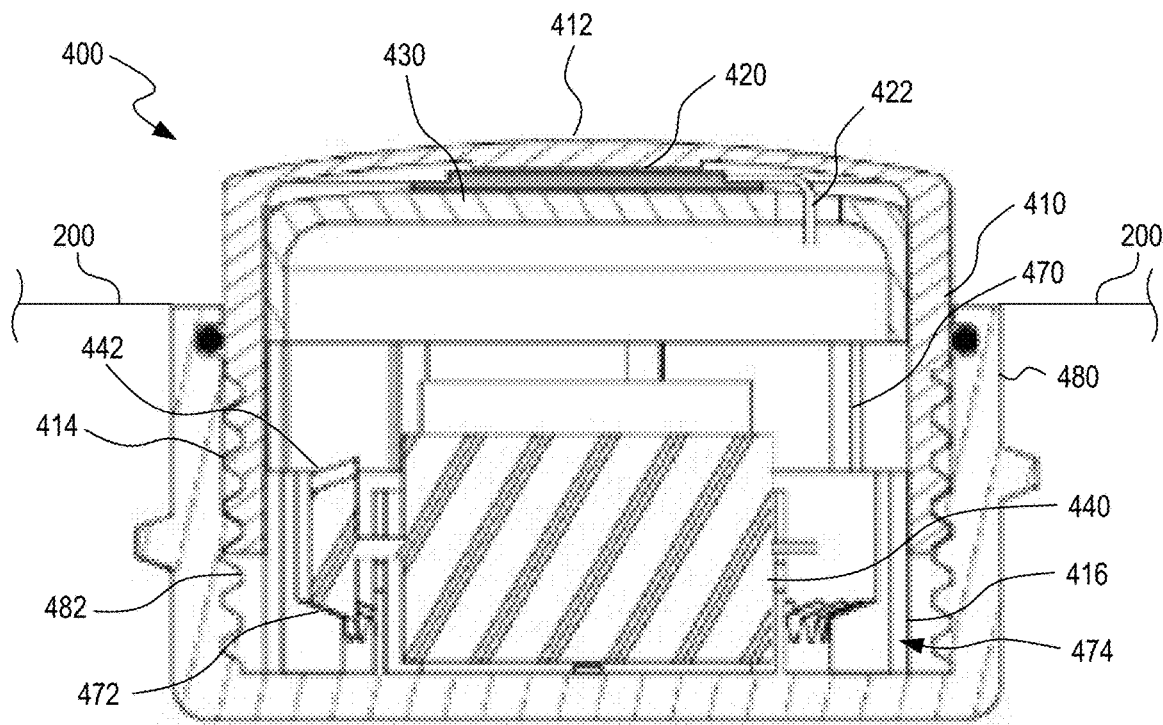

FIGS. 6A and 6B are side cross-sectional views of the traffic mitigation device 400 in the flush position and in the raised position, respectively. In FIG. 6A, the threads 414 are fully engaged with the threads 482 such that the cap 410 is positioned proximate to the bottom surface of the base 480. The pinion 442 is engaged with the ring gear 472 while the rotator 470 sits atop the bottom surface of the base 480 and around the motor 440. In FIG. 6B, the cap 410 is raised and positioned farther from the bottom surface of the base 480, and the threads 414 are not fully engaged with the threads 482. Because the support 430 is coupled to the cap 410, the support 430 and the piezoelectric element 420 are raised with the cap 410. However, the motor 440, the electronics unit 450, and the battery 460 remain proximate to the bottom surface of the base 480. The rotator 470 also remains proximate to the bottom surface of the base 480, although it has rotated with the cap 410.

During operation of the traffic mitigation device 400, the electronics unit 450 can control operation of the motor 440 to rotate the pinion 442 in a desired direction, at a desired rate, and by a desired angle. Rotation of the pinion 442 causes the rotator 470 to rotate about a vertical axis (e.g., an axis extending from the center of the bottom surface of the base 480 to the center of the flexible top 412) by virtue of the interlocked ring gear 472. Rotation of the rotator 470 causes the cap 410 to rotate by virtue of the engaged at least one rib 416, and rotation of the cap 410 raises or lowers the cap 410 by virtue of the interlocked threads 414 and 482, depending on the direction of the motor 440. The electronics unit 450 can therefore switch the traffic mitigation device 400 between the flush position (FIG. 6A), which allows vehicles to travel over the cap 410, and the raised position (FIG. 6B), which induces vehicle operators to slow down or stop the vehicle.

Referring to FIG. 6A, when the traffic mitigation device 400 is installed in a road and in the flush position (as seen in FIG. 1A), the top of the base 480 can be positioned flush with the road surface while the flexible top 412 of the cap 410 protrudes beyond the road surface. This allows the flexible top 412 to be depressed by the weight of vehicles traveling over the traffic mitigation device 400 and to apply a force on the piezoelectric element 420, allowing the piezoelectric element 420 to be compressed between the flexible top 412 and the support 430. The force acting on the piezoelectric element 420 thereby generates electricity and induces current to flow through the wire to power the motor 440 and the electronics unit 450, and/or charge the battery 460.

In some embodiments, the traffic mitigation device 400 can additionally or alternatively include a transparent top and a solar array positioned underneath the transparent top. The traffic mitigation device 400 can generate electricity using the solar array while the transparent top allows light to pass through and protects the solar array from damage.

In some embodiments, the traffic mitigation device includes a different mechanism to switch between the flush position and the raised position. For example, the traffic mitigation device can include a scissor jack coupled between the base and the cap, and the motor can be coupled to operate the scissor jack to move the cap between the flush position and the raised position. In another example, the traffic mitigation device can include a pinion coupled to the motor and a linear rack coupled to the cap, and the motor can be coupled to move the linear rack to move the cap between the flush position and the raised position. In yet another example, the traffic mitigation device can include wedges moveably coupled to the base and/or the cap, and the motor can be coupled to move the wedges closer together or farther apart to move the cap between the flush position and the raised position. In pneumatic or hydraulic embodiments, the traffic mitigation device can include one or more pumps, fluid devices (e.g., valves, flow restrictors), sensors (e.g., pressure sensors), or the like. For example, a vehicle can apply pressure when driving over a traffic mitigation device to drive fluid flow by, for example, applying pressure to a flexible cap. The fluid can be force into a valve-controlled reservoir. The vehicle can also push the cap down and re-pressurize the reservoir. In the manner, the traffic mitigation can be repressurized any number of times for actuation.

Figure 7:
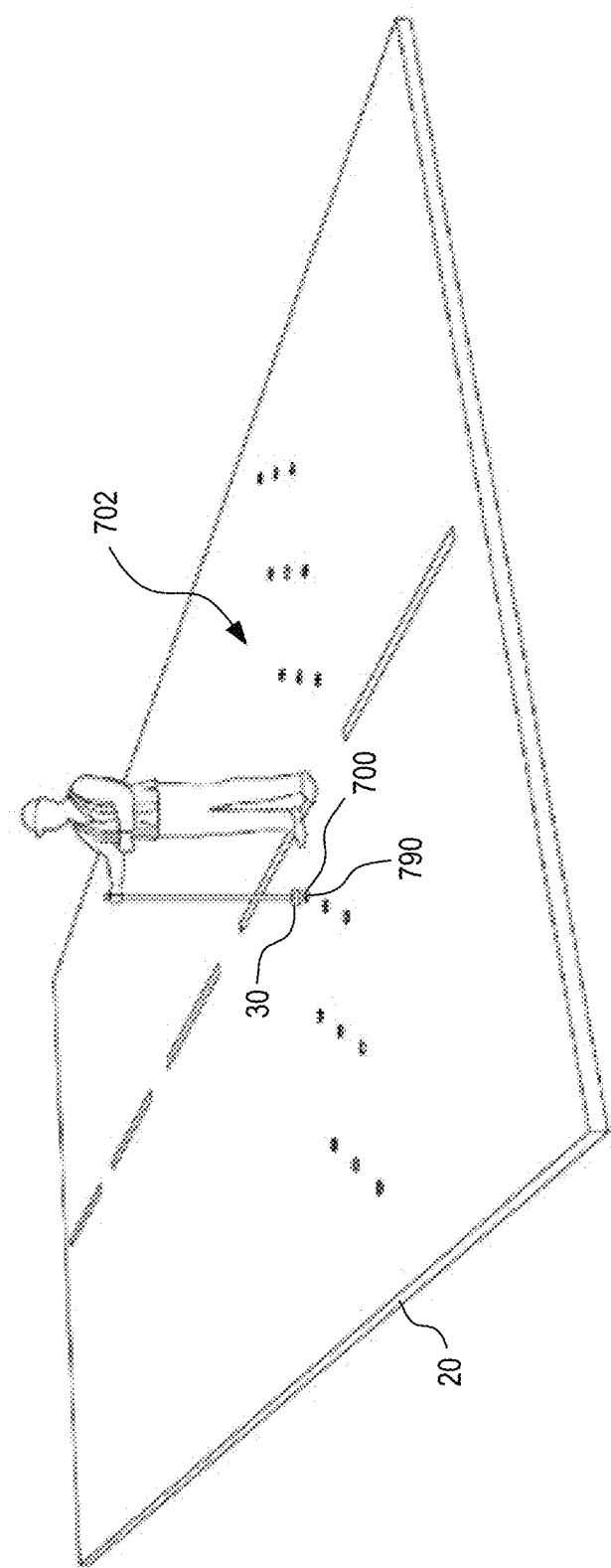
FIG. 7 is a perspective view of a traffic mitigation system and an operator magnet.

FIG. 7 is a perspective view of a traffic mitigation system 702 including a plurality of traffic mitigation devices 700 (e.g., the traffic mitigation device 100, 200, 300, or 400). Each traffic mitigation device 700 can include a magnetic switch 790 included in an electronics unit and operably coupled to a communication module. The magnetic switch 790 can be configurable between an on state and an off state. In some embodiments, the magnetic switch 790 is configured to switch to the on state when it detects an operator magnet 30 in proximity, and switch back to the off state after a predetermined period of time (e.g., 5 minutes, 15 minutes, 30 minutes, 45 minutes, 60 minutes, 120 minutes, etc.).

When toggled to the on state, the magnetic switch configures the communication module to enter a listening mode. When in the listening mode, the communication module searches for signals indicating desired operating times (e.g., a schedule) such as when to switch between the flush position and the raised position. When toggled to the off state, the magnetic switch configures the communication module to exit the listening mode and enter a reduced power mode. When in the reduced power mode, the communication module searches for signals with less frequency or does not search for signals at all. The ability to switch between the listening mode and the reduced power mode enables the communication module to save power compared to when the communication module is configured to always be in the listening mode. In some embodiments, a human operator can carry the operator magnet 30 across the traffic mitigation system 702 to activate the magnetic switches 790 prior to sending signals to one or more of the traffic mitigation devices 700.

Figure 8:
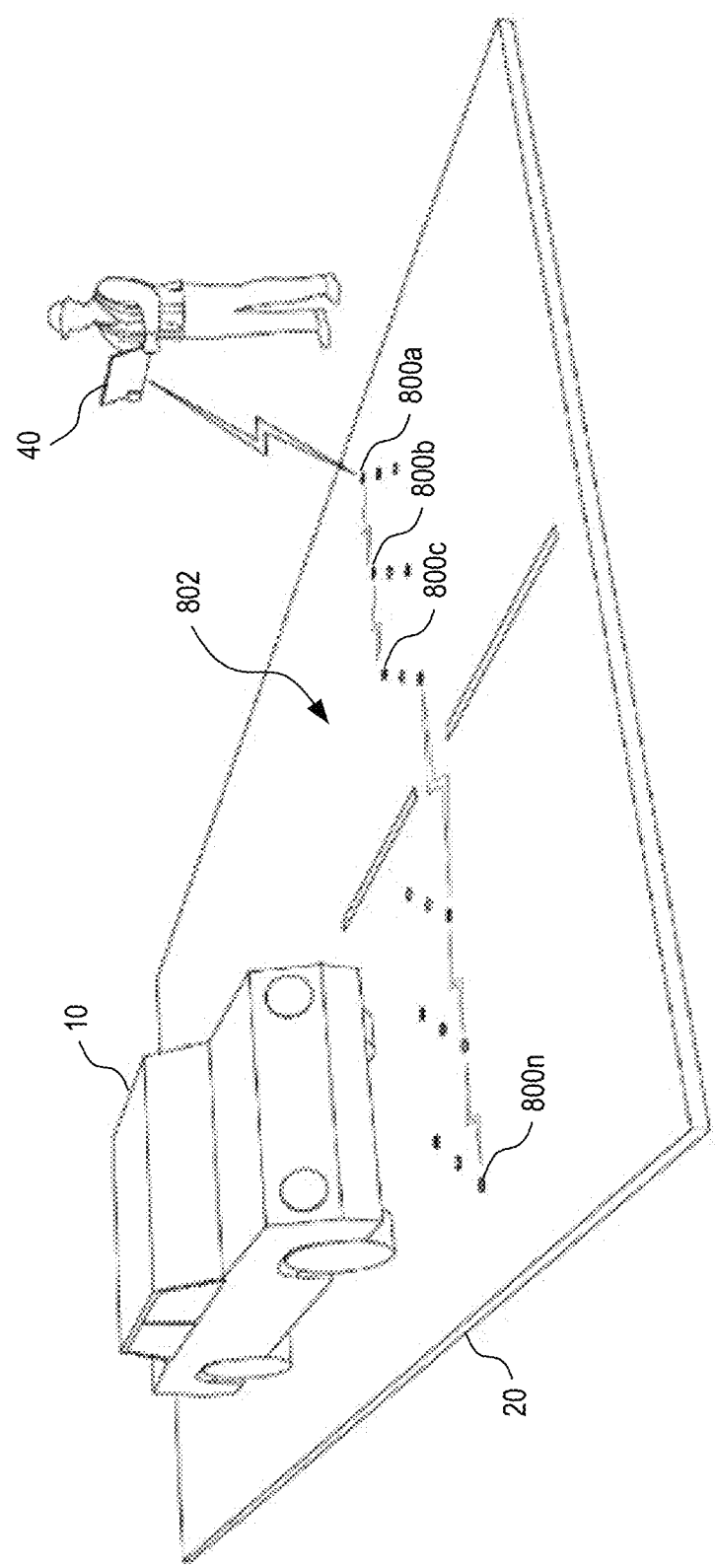
FIG. 8 is a perspective view of a traffic mitigation system in a listening mode.

FIG. 8 is a perspective view of a traffic mitigation system 802 including a plurality of traffic mitigation devices 800a . . . n (collectively referred to as "traffic mitigation devices 800") (e.g., the traffic mitigation device 100, 200, 300, or 400) in a listening mode. As discussed above with respect to FIG. 7, when the traffic mitigation device 800 is in the listening mode, the communication module is searching for signals indicating desired operating times (e.g., a schedule) such as when to switch between the flush position and the raised position, the current date and time, etc. The controller or control circuit in the traffic mitigation devices 800 can be wirelessly programmed by at least one of a remote computing system via a wide area network, a user device or operator device 40, etc. In the illustrated embodiment, a first traffic mitigation device 800a receives signals from the operator device 40 (e.g., wirelessly). In some embodiments, multiple traffic mitigation devices (e.g., 800a, 800b, and 800c) receive signals from the operator device 40. The communication modules of the traffic mitigation devices 800 then communicate with one another such that the signals are transmitted from the one or more traffic mitigation devices 800 that received the signals from the operator device 40 to the remaining ones of the traffic mitigation devices 800.

In some embodiments, each of the traffic mitigation devices 800 is programmed to maintain and communicate via a network (e.g., a wireless network, a mesh network, a wide area network, wired network, etc.) to coordinate actuation of all or some of the traffic mitigation devices 800 based on the schedule. For example, the controller or control circuit in the traffic mitigation devices 800 can be programmed to command (e.g., via a wireless network) a set of the traffic mitigation devices 800 to be locked in the raised for a speed reduction time period in the schedule, and to be in the flush position for a non-traffic mitigation time period in the schedule. In some embodiments, the programmed traffic mitigation devices 800 can communicate with each other independent of any remote server device for forming a wireless mesh network operable to coordinate operation of the networked traffic mitigation devices 800. In some embodiments, the programmed traffic mitigation devices 800 can communicate with each other independent via cloud communications routed by a remote server device.

By configuring a portion of the traffic mitigation system 802 to receive signals from the operator device 40 and configuring the traffic mitigation devices 800 to share information, the total amount of data transfer to the traffic mitigation system 802 can be significantly reduced. For example, the operator device 40 may only need to upload the desired operating times to the first traffic mitigation device 800a instead of having to upload to each traffic mitigation device 800a . . . n. Moreover, the traffic mitigation devices 800 can communicate with each other to also synchronize their operations such that traffic mitigation devices 800 switch between the flush position and the raised position simultaneously, in a pattern, etc. For example, the traffic mitigation devices 800 can communicate to one another signals comprising an indication of when each cap is about to move between the flush position and the raised position.

Figure 9:
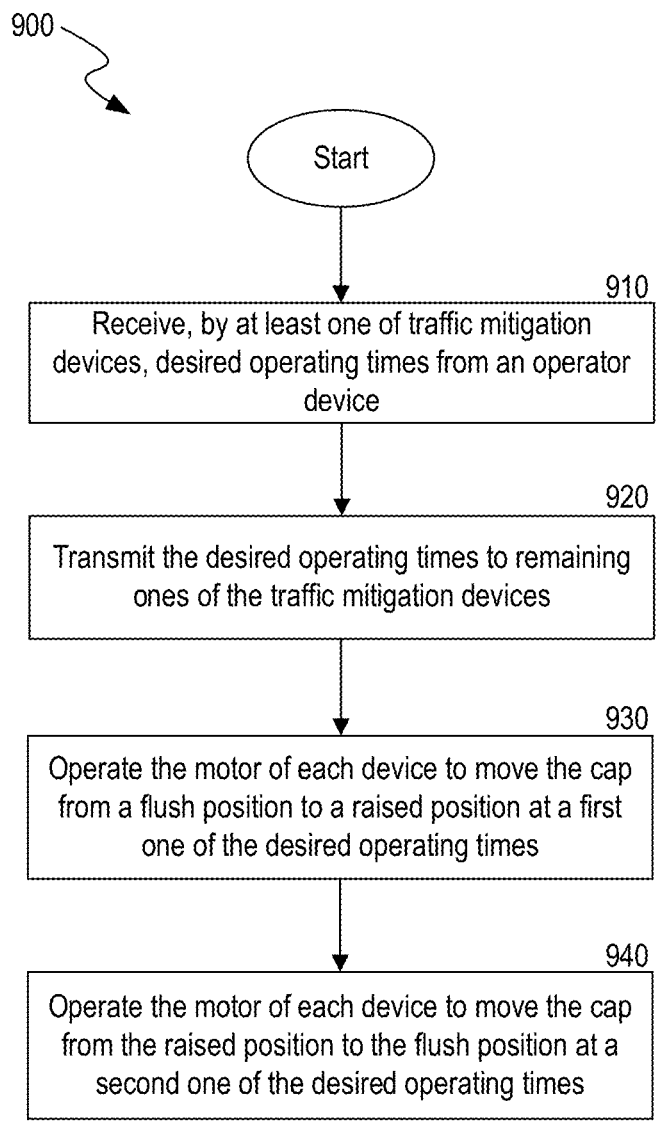
FIG. 9 is a flowchart illustrating a method of mitigating traffic.

FIG. 9 is a flowchart illustrating a method 900 of mitigating traffic. The method 900 can be performed by a computer-implemented system comprising a plurality of traffic mitigation devices (e.g., device 200). Each device can include an electronic storage medium comprising computer-executable instructions and one or more processors in electronic communication with the electronic storage medium and configured to execute the computer-executable instructions in order to perform the method 900.

The method 900 can include receiving, by at least one of the traffic mitigation devices of the computer-implemented system, desired operation times from an operator device (process portion 910). The method 900 can then include transmitting, by the computer-implemented system, the desired operating times to remaining ones of the traffic mitigation devices (process portion 920). In some embodiments, each device includes a base, a cap movably coupled to the base, a motor coupled to move the cap between a flush position and a raised position, and a battery coupled to the motor.

The method 900 can then include operating, by the computer-implemented system, the motor of each device to move the cap from the flush position to the raised position at a first one of the desired operating times (process portion 930). For example, if the traffic mitigation devices are installed around a school, the first one of the desired operating times can be 7:00 am every weekday excluding holidays and vacation days, corresponding to when students begin commuting to school and student traffic begins to rise. The method 900 can then include operating, by the computer-implemented system, the motor of each device to move the cap from the raised position to the flush position at a second one of the desired operating times (process portion 940). For example, if the traffic mitigation devices are installed around a school, the second one of the desired operating times can be 9:00 am every weekday excluding holidays and vacation days, corresponding to when classes begin and student traffic has generally dropped to near zero.

IV. Computer Systems and Environment

Figure 10:
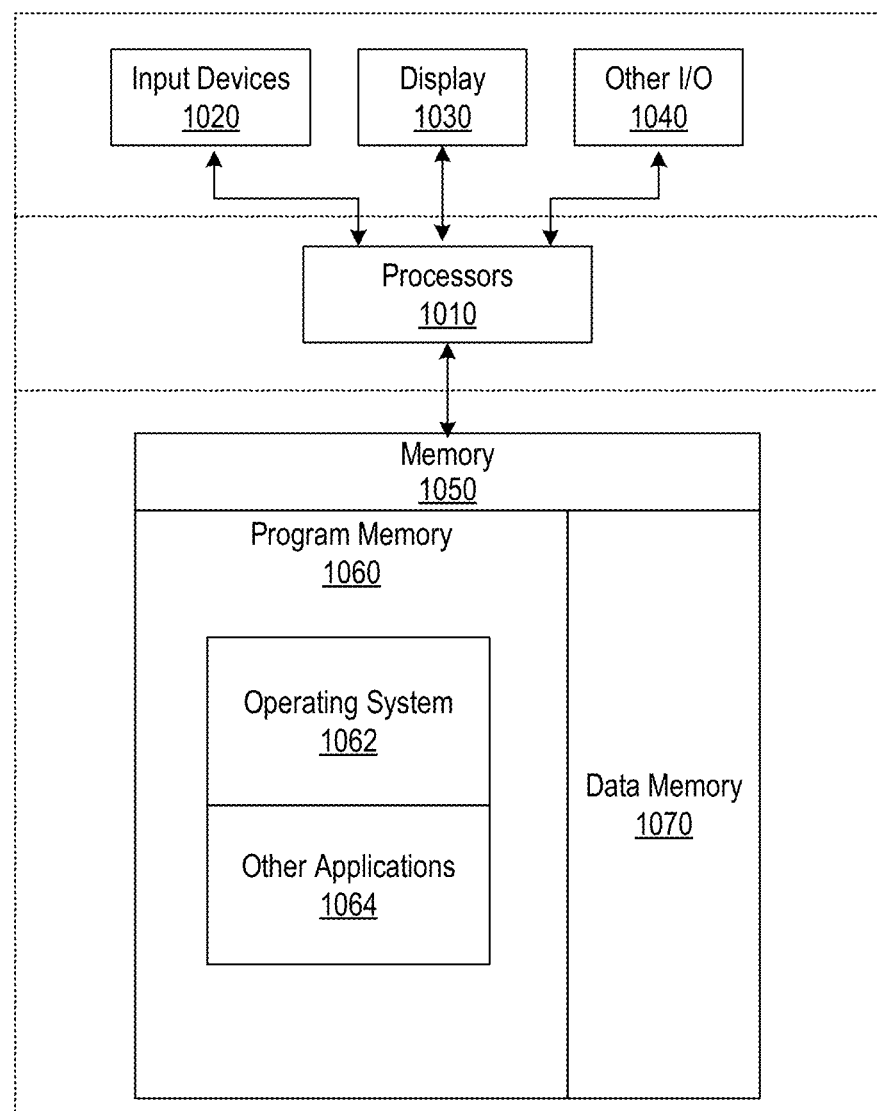
FIG. 10 is a block diagram illustrating an overview of devices on which some implementations of the disclosed technology can operate.

Several implementations are discussed below in more detail in reference to the figures. FIG. 10 is a block diagram illustrating an overview of electronic units on which some implementations of the disclosed technology can operate. The electronic unit or device 1000 can comprise hardware components that execute instructions to receive and/or transmit signals, operate motors, etc. The description of the electronic unit 1000 applies to the electronic unit 240 of FIGS. 2A and 2B and other electronic units and traffic mitigation devices disclosed herein.

The electronic unit 1000 can include one or more input devices 1020 that provide input to the Processor(s) 1010 (e.g., CPU(s), GPU(s), HPU(s), etc.), notifying it of actions. The actions can be mediated by a hardware controller that interprets the signals received from the input device and communicates the information to the processors 1010 using a communication protocol. Input devices 1020 include, for example, a touchscreen, an infrared sensor, a magnetic sensor, a touchpad, a camera- or image-based input device, a microphone, a transceiver, or other user input devices. In some embodiments, a touchscreen can be located along the bottom of the traffic mitigation device. During installation, the touchscreen can be used to input information that is stored by the traffic mitigator. In some embodiments, the input device can include one or more cameras that captures images of vehicles (e.g., approaching vehicles, overpassing vehicles, and/or departing vehicles), pedestrians, environmental conditions (e.g., weather, light conditions, visibility conditions, etc.). The images can be collected to monitor traffic, detect mitigation effects, or the like. The number and configuration of the input devices can be selected based on the environment in which the traffic mitigation devices are installed.

Processors 1010 can be a single processing unit or multiple processing units in a device or distributed across multiple devices. Processors 1010 can be coupled to other hardware devices, for example, with the use of a bus, such as a PCI bus or SCSI bus. The processors 1010 can communicate with a hardware controller for devices, such as for a display 1030. Display 1030 can be used to display color light (e.g., flashing light, continuous light, etc.), as discussed in connection with lighting of device 200.

In some implementations, the device 1000 also includes a communication device capable of communicating wirelessly or wire-based with a network node. The communication device can communicate with another device or a server through a network using, for example, TCP/IP protocols and other protocols, including mesh protocols. Device 1000 can utilize the communication device to distribute operations across multiple network devices.

The processors 1010 can have access to a memory 1050 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 1050 can include program memory 1060 that stores programs and software, such as an operating system 1062 and other application programs 1064. Memory 1050 can also include data memory 1070, storing data, information, settings, protocols, programs, etc.

Figure 11:
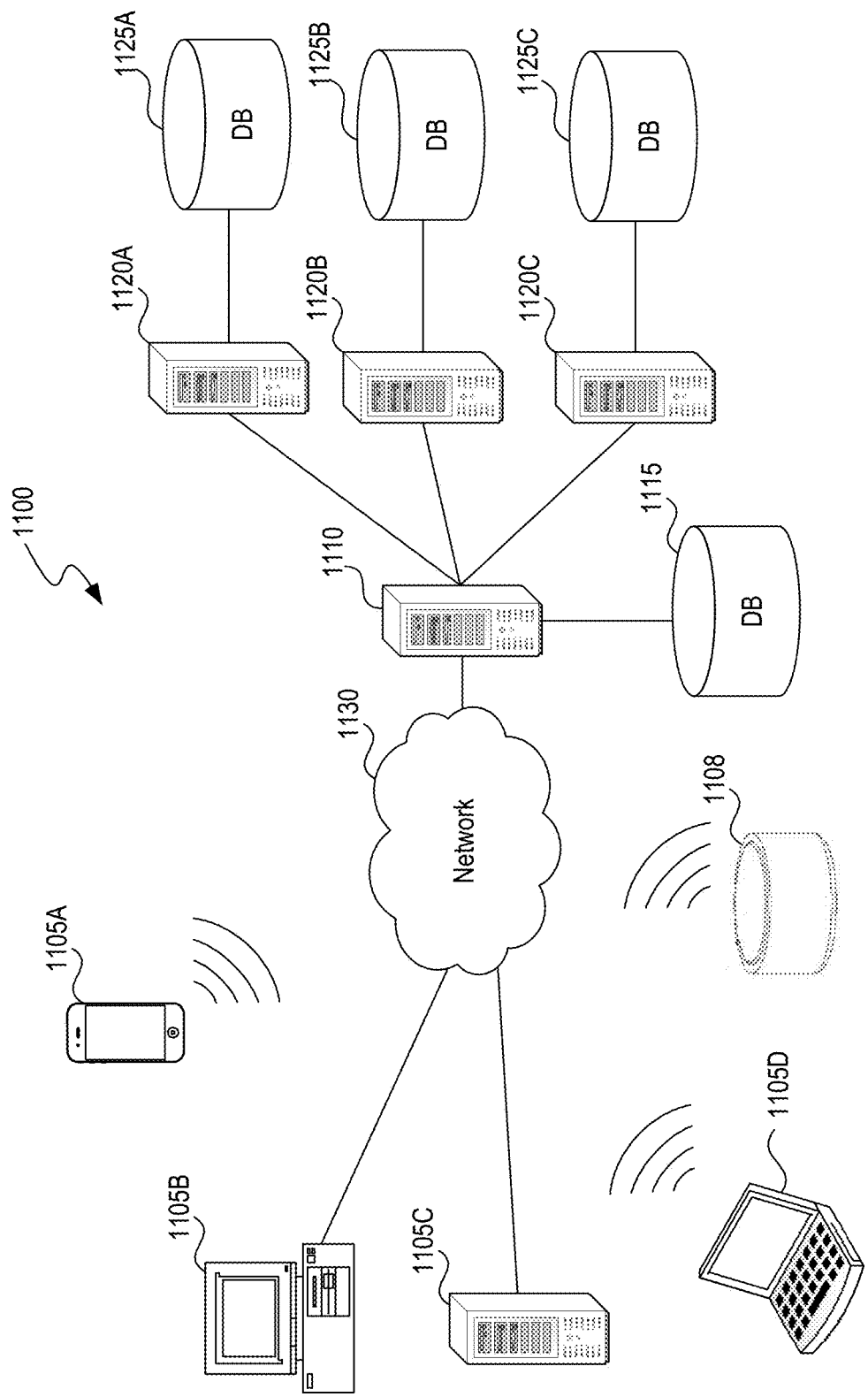
FIG. 11 is a block diagram illustrating an overview of an environment in which some implementations of the disclosed technology can operate.

FIG. 11 is a block diagram illustrating an overview of an environment 1100 in which some implementations of the disclosed technology can operate. Environment 1100 can include one or more user devices or operator computing devices 1105A-D (collectively referred to as "operator computing devices 1105"), examples of which can include smartphones, computers, tablets, and/or operator device 40 (FIG. 8). Client computing devices 1105 can operate in a networked environment using logical connections through network 1130 to one or more remote computers, such as a server computing device. Similarly, traffic mitigation device 1108 (e.g., the device 1000) can operate in the networked environment using logical connections through network 1130 to one or more remote computers, such as a server computing device. In some embodiments, the traffic mitigation device 1108 communicates with the client computing devices 1105 via local communication. In some embodiments, the traffic mitigation device 1108 communications can be based on one of various types of communication protocols or standards, such as a Bluetooth® standard, a Wi-Fi Direct standard, a NFC standard, a ZigBee® standard, Z-wave standards, Matter standards, a 6LoWPAN standard, etc.

In some implementations, server 1110 can be an edge server which receives client requests and coordinates fulfillment of those requests through other servers, such as servers 1120A-C. Server computing devices 1110 and 1120 can comprise computing systems. Though each server computing device 1110 and 1120 is displayed logically as a single server, server computing devices can each be a distributed computing environment encompassing multiple computing devices located at the same or at geographically disparate physical locations. In some implementations, each server 1120 corresponds to a group of servers.

Client computing devices 1105, traffic mitigation device 1108, and server computing devices 1110 and 1120 can each act as a server or client to other server/client devices. Server 1110 can connect to a database 1115. Servers 1120A-C can each connect to a corresponding database 1125A-C. As discussed above, each server 1120 can correspond to a group of servers, and each of these servers can share a database or can have their own database. Databases 1115 and 1125 can warehouse (e.g., store) information such as table data, column data, value filter data, user interface data, database element data, selection data, root table data, code snippet data, join query data, query template data, connection data. Though databases 1115 and 1125 are displayed logically as single units, databases 1115 and 1125 can each be a distributed computing environment encompassing multiple computing devices, can be located within their corresponding server, or can be located at the same or at geographically disparate physical locations.

Network 1130 can be a local area network (LAN) or a wide area network (WAN), but can also be other wired or wireless networks. Network 1130 may be the Internet or some other public or private network. Client computing devices 1105 can be connected to network 1130 through a network interface, such as by wired or wireless communication. While the connections between server 1110 and servers 1120 are shown as separate connections, these connections can be any kind of local, wide area, wired, or wireless network, including network 1130 or a separate public or private network. As described in further detail herein, the client computing devices 1105 can operate according to an edge computing protocol (e.g., an edge computing decryption protocol).

Figure 12:
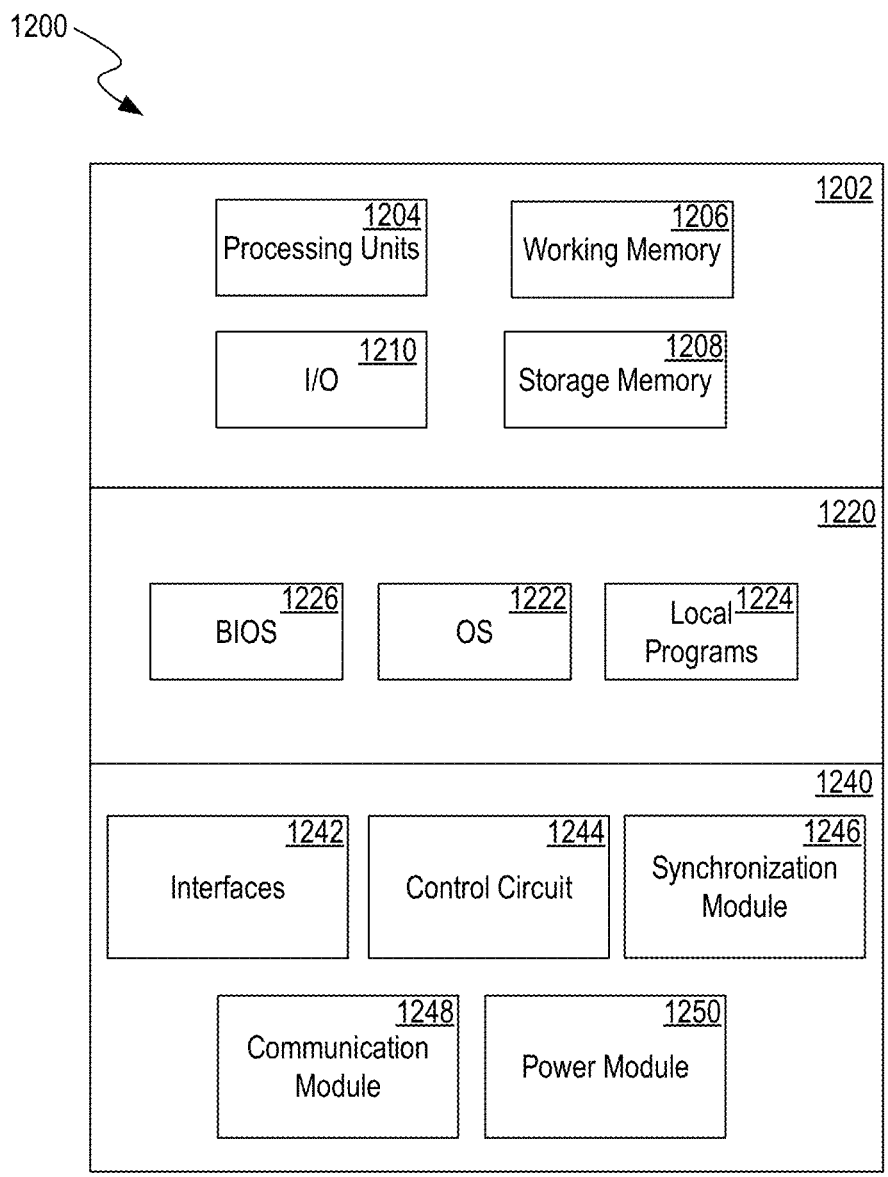
FIG. 12 is a block diagram illustrating components which, in some implementations, can be used in a system employing the disclosed technology.

FIG. 12 is a block diagram illustrating components 1200 which, in some implementations, can be used in a system employing the disclosed technology. In some implementations, some or all of the components 1200 can be included in a traffic mitigation device. The components 1200 include hardware 1202, general software 1220, and specialized components 1240. As discussed above, a system implementing the disclosed technology can use various hardware including processing units 1204 (e.g., CPUs, GPUs, APUs, etc.), working memory 1206, storage memory 1208 (local storage or as an interface to remote storage, such as storage 1115 or 1125), and input and output devices 1210. In various implementations, storage memory 1208 can be one or more of: local devices, interfaces to remote storage devices, or combinations thereof. For example, storage memory 1208 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 1115 or storage provided through another server 1120). Components 1200 can include a machine-readable storage medium having machine executable instructions stored thereon. Components 1200 can be implemented in a traffic mitigation device such as device 1000, traffic mitigation device 1108, or on a server computing device, such as server computing device 1110 or 1120.

General software 1220 can include various applications including an operating system 1222, local programs 1224, and a basic input output system (BIOS) 1226. Specialized components 1240 can be subcomponents of a general software application 1220, such as local programs 1224. Specialized components 1240 can include control circuit 1244, synchronization module 1246, communication module 1248, and power module 1250, and components which can be used for providing user interfaces, transferring data, and controlling the specialized components, such as interfaces 1242. In some implementations, components 1200 can be in a computing system that is distributed across multiple computing devices or can be an interface to a server-based application executing one or more of specialized components 1240. Although depicted as separate components, specialized components 1240 may be logical or other non-physical differentiations of functions and/or may be sub-modules or code-blocks of one or more applications.

In some implementations, the control circuit 1244 is configured to control operation of a motor to switch the traffic mitigation device between a flush position and a raised position. The control circuit 1244 can control the direction, rate, and angle of the motor rotation. In pneumatic or hydraulic embodiments, the control circuit 1244 can control one or more pumps, fluid devices (e.g., valves, flow restrictors), sensors (e.g., pressure sensors), or the like. For example, a vehicle can apply pressure when driving over a traffic mitigation device to drive fluid flow by, for example, applying pressure to a flexible cap. The fluid can be force into a valve-controlled reservoir. The control circuit 1244 can operate (e.g., open) a valve to allow the pressure to lift a cap. The vehicle can also push the cap down and re-pressurize the reservoir. In the manner, the traffic mitigation can be repressurized any number of times for actuation. In some embodiments, the fluid flow can be controlled using mechanical components without any control circuit.

In some implementations, the synchronization module 1246 is configured to synchronize the rise and fall of the cap (e.g., the cap 206) with the caps of other traffic mitigation devices when the traffic mitigation devices are switched between the flush position and the raised position. As discussed above with respect to FIG. 8, synchronizing multiple the operations of multiple devices can be advantageous by allowing the traffic mitigation devices 800 to switch between the flush position and the raised position simultaneously, in a pattern, etc.

In some implementations, the communication module 1248 is configured to receive and transmit various signals to and from operator devices (e.g., the operator device 40, the operator computing devices 1105) and/or other traffic mitigation devices. The signals can include desired operating times such as when to switch between the flush position and the raised position, the current date and time, etc. As discussed above with respect to FIG. 11, the communication module 1248 can communicate over a network, via local communication, etc. For example, the communication module 1248 and other communication devices can be configured to communicate using, for example, a mesh network protocol, a ZigBee® communication protocol, a Z-Wave® communication protocol, Matter protocol, a wireless local area network, a home wireless communication protocol, a IoT protocol, or another communication protocol, such as 802.11.

In some implementations, the power module 1250 is configured to manage the power of the traffic mitigation device. The power module 1250 can receive signals or other indications relating to the power generator (e.g., how much power the piezoelectric element or the solar array is generating), the battery (e.g., charge level, battery life), and other electronic components (e.g., power usage distribution). In some implementations, the power module 1250 can override any operation modes and instruct the control circuit 1244 to return the traffic mitigation device in the flush position when the battery level is low such that the traffic mitigation device does not unnecessarily impede traffic and can charge the battery.

Those skilled in the art will appreciate that the components illustrated in FIGS. 10-12 described above, and the flow diagrams discussed above, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

V. Conclusion

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "embodiments" or "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

What is claimed is:

1. A traffic mitigation device, the device comprising:
  a base having a base sidewall including first threads;
  a cap movably coupled to the base, the cap having a cap sidewall including second threads and at least one rib;
  a motor operable to move the cap between a flush position and a raised position by rotating the cap along the first threads engaged by the second threads;
  a pinion coupled to the motor;
  a rotator rotatably positioned in the base, the rotator including a ring gear positioned to engage the pinion and at least one slot positioned to engage the at least one rib;
  a battery electrically coupled to the motor;
  a power generator electrically coupled to the battery, wherein the power generator is configured to generate electricity and charge the battery with the generated electricity; and
  an electronics unit housed in the base or the cap, wherein the electronics unit comprises:
    a control circuit configured to control operation of the motor; and a communication module operably coupled to the control circuit, wherein the communication module is configured to receive one or more signals from communication modules of adjacent traffic mitigation devices, wherein operation of the motor rotates the pinion along a motor axis, wherein rotating the pinion rotates the ring gear and thereby the rotator and the at least one slot about a vertical axis, wherein rotating the at least one slot rotates the at least one rib and thereby the cap about the vertical axis, wherein rotating the cap causes the second threads to engage the first threads and thereby move the cap between the flush position and the raised position, and wherein the control circuit is configured to operate the motor such that the cap moves between the flush position and the raised position synchronously with caps of the adjacent traffic mitigation devices based on the one or more signals.

2. The traffic mitigation device of claim 1, wherein the communication module is further configured to receive one or more operator signals comprising operator-inputted operating times from an operator device.

3. The traffic mitigation device of claim 1, further comprising a magnetic switch operably coupled to the communication module and configurable between an on state and an off state, wherein the communication module is in a listening mode when the magnetic switch is in the on state, and wherein the communication module is in a reduced power mode when the magnetic switch is in the off state.

4. The traffic mitigation device of claim 3, wherein the magnetic switch is configured to switch to the on state when in proximity to an operator magnet, and wherein the magnetic switch is configured to switch to the off state after a predetermined period of time.

5. The traffic mitigation device of claim 1, wherein:
the cap includes a flexible top,
the power generator comprises at least one piezoelectric element positioned underneath the flexible top, and
when the cap is in the flush position, the flexible top is positioned to be depressed by a weight of a vehicle, thereby applying a force on the piezoelectric element to cause energy to be generated by the power generator.

6. The traffic mitigation device of claim 1, wherein:
the cap includes a transparent top, and
the power generator comprises a solar array positioned underneath the top.

7. The traffic mitigation device of claim 1, wherein the base includes a locking feature configured to releasably secure the base inside a road socket.

* * * * *